(12) United States Patent
Romo

(10) Patent No.: US 10,689,105 B2
(45) Date of Patent: Jun. 23, 2020

(54) PASSENGER-CARRYING ROTORCRAFT WITH FIXED-WINGS FOR GENERATING LIFT

(71) Applicant: John Daniel Romo, San Antonio, TX (US)

(72) Inventor: John Daniel Romo, San Antonio, TX (US)

(*) Notice: Subject to any disclaimer, the term of this patent is extended or adjusted under 35 U.S.C. 154(b) by 283 days.

(21) Appl. No.: 15/820,373

(22) Filed: Nov. 21, 2017

(65) Prior Publication Data

US 2018/0141653 A1 May 24, 2018

Related U.S. Application Data

(60) Provisional application No. 62/424,664, filed on Nov. 21, 2016.

(51) Int. Cl.
| | |
|---|---|
| *B64C 39/08* | (2006.01) |
| *B64C 29/00* | (2006.01) |
| *B64C 3/56* | (2006.01) |
| *B64D 27/02* | (2006.01) |

(52) U.S. Cl.
CPC ............ *B64C 29/0025* (2013.01); *B64C 3/56* (2013.01); *B64C 39/08* (2013.01); *B64D 2027/026* (2013.01); *B64D 2211/00* (2013.01); *Y02T 50/64* (2013.01)

(58) Field of Classification Search
CPC ....... B64C 29/0025; B64C 39/08; B64C 3/56; B64D 2027/026; B64D 2211/00; Y02T 50/64

USPC .......................................................... 244/6
See application file for complete search history.

(56) References Cited

U.S. PATENT DOCUMENTS

| 2,290,850 | A | * | 7/1942 | Umschweif | B64C 3/56 244/49 |
|---|---|---|---|---|---|
| 3,089,666 | A | * | 5/1963 | Quenzler | B64C 29/0033 244/7 R |
| 3,834,654 | A | * | 9/1974 | Miranda | B64C 39/068 244/13 |
| 4,697,761 | A | * | 10/1987 | Long | B64D 27/24 244/62 |
| 5,310,138 | A | * | 5/1994 | Fitzgibbon | B64C 3/56 244/49 |
| 5,427,329 | A | * | 6/1995 | Renzelmann | B64C 3/56 244/49 |

(Continued)

*Primary Examiner* — Claude J Brown

(57) ABSTRACT

A passenger-carrying rotorcraft with fixed-wings for generating lift utilizes an occupiable structural body, a control unit, a plurality of lift-generating rotors, a portable power source, and a bi-wing structure. The rotorcraft configured with fixed-wings results in an energy-efficient aircraft capable of vertical takeoff and landing. The occupiable structural body is designed to carry a pilot and one or more passengers. The control unit is wired to flight instruments controlled by the pilot, allowing the pilot to maneuver the rotorcraft. The plurality of lift-generating rotors provides upward thrust for vertical takeoff and landing of the rotorcraft. The portable power source is charged by a hybrid power generation system running on both renewable solar energy and a non-renewable chemical fuel source. The bi-wing structure employs two airfoils positioned on top of each other to maximize the lift without significantly increasing the effective wingspan.

17 Claims, 9 Drawing Sheets

(56) References Cited

U.S. PATENT DOCUMENTS

| | | | |
|---|---|---|---|
| 6,293,491 B1* | 9/2001 | Wobben | B64C 27/00 244/17.23 |
| 6,619,584 B1* | 9/2003 | Haynes | B60F 5/02 244/2 |
| 7,874,512 B2* | 1/2011 | Xu | B64C 37/00 244/2 |
| 9,085,355 B2* | 7/2015 | DeLorean | B64C 29/0033 |
| 9,493,235 B2* | 11/2016 | Zhou | B60F 5/02 |
| 9,545,993 B2* | 1/2017 | McGinnis | B64C 9/00 |
| 9,694,908 B2* | 7/2017 | Razroev | B64C 29/0033 |
| 2007/0057113 A1* | 3/2007 | Parks | B64C 15/00 244/12.5 |
| 2011/0042509 A1* | 2/2011 | Bevirt | B64C 29/0033 244/12.4 |
| 2011/0303795 A1* | 12/2011 | Oliver | B64C 29/0033 244/7 R |
| 2012/0234968 A1* | 9/2012 | Smith | B64C 29/0033 244/12.3 |
| 2013/0020429 A1* | 1/2013 | Kroo | B64C 3/16 244/6 |
| 2014/0097290 A1* | 4/2014 | Leng | B64C 29/0025 244/6 |
| 2015/0360775 A1* | 12/2015 | Arai | B64D 27/24 244/12.1 |
| 2016/0167092 A1* | 6/2016 | Gaw | B08B 1/04 244/201 |
| 2016/0297520 A1* | 10/2016 | Sada-Salinas | B64C 29/0025 |
| 2016/0347447 A1* | 12/2016 | Judas | B64C 29/0025 |
| 2017/0174314 A1* | 6/2017 | Diamante | B64C 3/56 |
| 2017/0240273 A1* | 8/2017 | Yuen | B64D 35/00 |
| 2018/0002012 A1* | 1/2018 | McCullough | B64C 29/0033 |
| 2018/0065742 A1* | 3/2018 | Vondrell | B64C 21/06 |

* cited by examiner

PASSENGER-CARRYING ROTORCRAFT WITH FIXED-WINGS FOR GENERATING LIFT

The current application claims a priority to the U.S. Provisional Patent application Ser. No. 62/424,664 filed on Nov. 21, 2016.

FIELD OF THE INVENTION

The present invention generally relates to a passenger-carrying rotorcraft with lift-generating fixed-wings. More specifically, the present invention utilizes a bi-wing structure positioned between a plurality of lift-generating rotors to enable highly efficient flight.

BACKGROUND OF THE INVENTION

It is well known in the relevant arts that gliding cuts down fuel consumption in half. This is especially true in the case for light fixed-wing aircrafts that excel at fuel efficiency. By gliding for the majority of the time, light fixed-wing aircrafts burn only half the fuel traditional helicopters burn per hour. For example, a helicopter that burns 15 gallons per hour would travel no faster or higher than a fixed-wing aircraft that burns only 7 gallons per hour.

However, helicopters present several advantages to modern fixed-wing aircraft. In particular, helicopters do not require long runways to take-off or land. Helicopters can vertically take off and land on a small patch of land. Also, a fixed-wing aircraft needs to ensure a steady flow of air over their wings to generate lift. This means that if the fixed-wing aircraft fails to keep air flowing over their wings, the fixed-wing aircraft will no longer be able to fly. Additionally, if the velocity of the airflow over the wings is too low, the aircraft can stall and crash. By rotating the propellers, helicopters ensure that the air flowing over each individual propeller blade is fast enough to generate the required lift. This means that helicopters can generate lift even when they are stationary in relation to the ambient air. Thus, helicopters possess several desirable advantages over fixed-wing aircraft.

The present invention is a passenger carrying quadcopter with lift-generating fixed-wings that allow the present invention to glide. The objective of the present invention is to provide an aircraft that combines the advantages of the light fixed-wing aircraft and helicopters. The present invention uses a plurality of lift-generating rotors to generate lift irrespective of the velocity of the air flow in relation to the fuselage of the present invention. The present invention also uses a bi-wing assembly to augment the lift generated by the plurality of lift-generating rotors. Once the present invention starts traveling at a certain velocity, the air flow over the bi-wing assembly generates a significant amount of lift. Thus, the plurality of lift-generating rotors may then operate according to an energy efficient profile which maximizes the range and minimizes fuel consumption.

Another objective of the present invention is to present a novel way of configuring the plurality of lift-generating rotors and the bi-wing assembly. In particular, the bi-wing assembly is positioned to take advantage of the downward airflow provided by the plurality of lift-generating rotors in a manner which increases the magnitude of the lift.

DETAILED DESCRIPTION OF THE INVENTION

All illustrations of the drawings are for the purpose of describing selected versions of the present invention and are not intended to limit the scope of the present invention.

Figure 2:
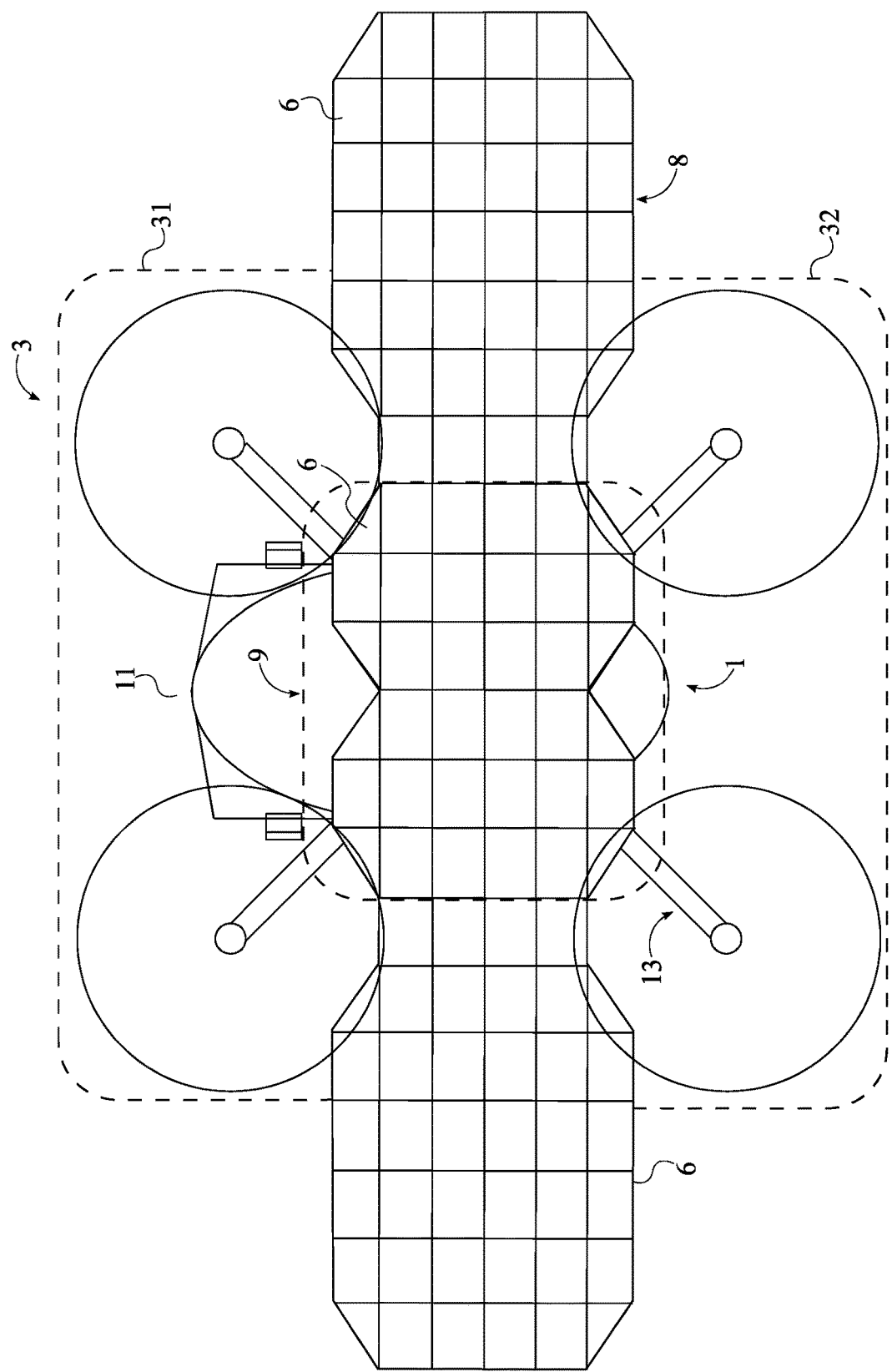
FIG. 2 is a top view of the present invention showing the plurality of solar cells distributed between the primary wing and the secondary wing.
Figure 6:
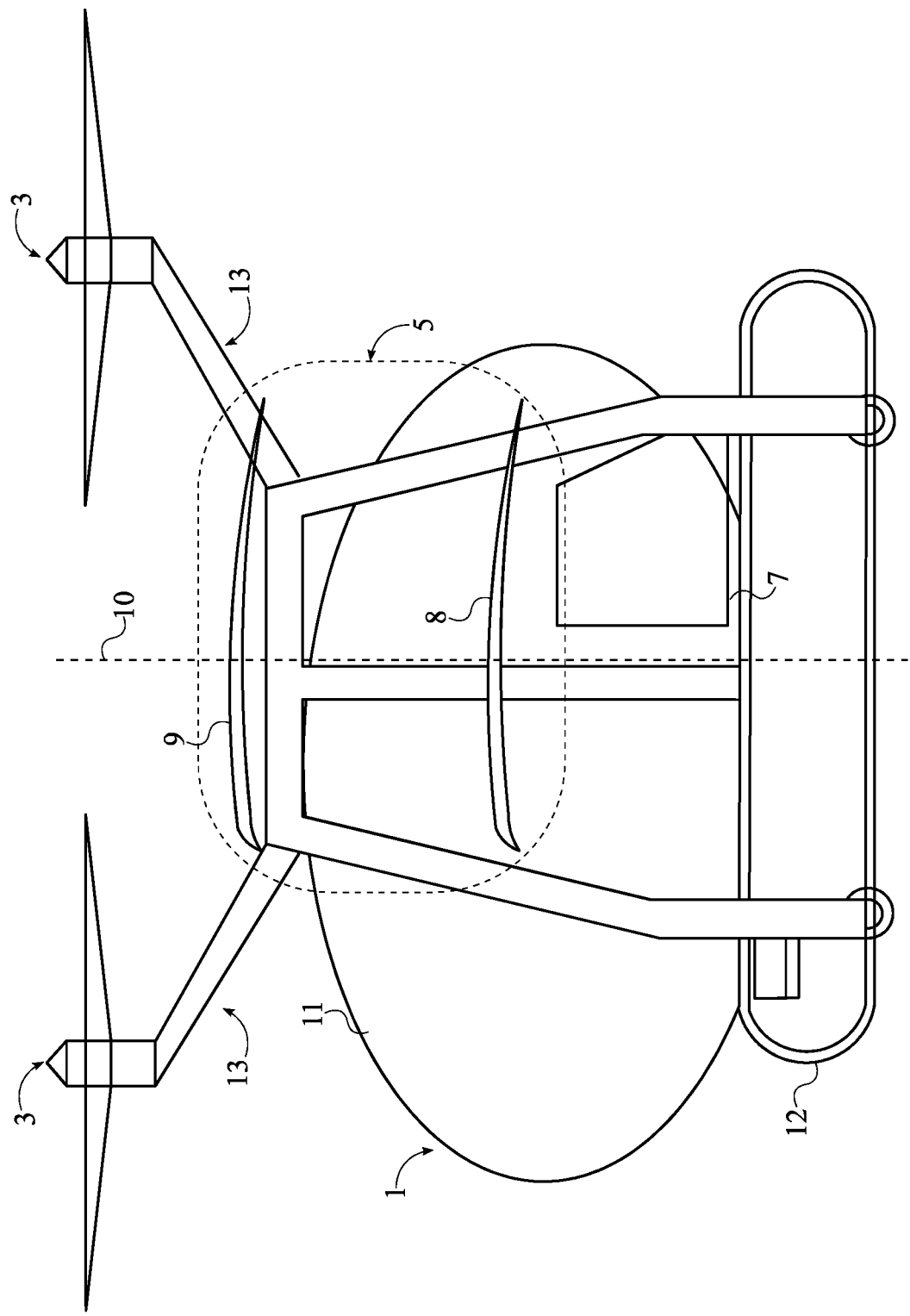
FIG. 6 is a side view of the present invention showing the placement of the convex side and the concave side about the wing body.

The present invention is a passenger-carrying rotorcraft with lift-generating fixed-wings and a hybrid power-plant capable of regenerating energy. The fixed-wings and the hybrid power-plant enables highly efficient powered flight. Referring now to FIG. 2 and FIG. 6, the preferred embodiment of the present invention comprises an occupiable structural body 1, a control unit 2, a plurality of lift-generating rotors 3, a portable power source 4, and a bi-wing structure 5. The occupiable structural body 1 is designed to efficiently carry passengers and/or cargo over long distances. The occupiable structural body 1 comprises a fuselage 11, a landing gear 12, and a plurality of pylons 13. Since the present invention is a manned aerial vehicle, the fuselage 11 may enclose a cockpit. The cockpit may contain flight instruments on an instrument panel that allow a pilot to fly the aircraft. Seats are provided for the pilot and at least one other occupant traveling with the pilot. Alternately, the present invention may be used to carry several passengers along with the pilot, in which case, the fuselage 11 may contain a cabin filled with seats. The preferred embodiment also comprises two doors hingedly attached to the fuselage 11. The first door is positioned adjacent to the pilot's seat and the second door may be positioned adjacent to the occupant's seat, opposite the first door.

Referring specifically to FIG. 6, the preferred fuselage 11 features an elliptical shape designed to minimize aerodynamic drag and increase fuel efficiency. This allows the present invention to travel long distances without having to refuel. Conventional fixed wing aircrafts need a runway to accelerate and gather speed before they can take-off. In contrast, the present invention is designed to vertically take off from and land in confined spaces. Therefore, the landing gear 12 is laterally mounted onto the fuselage 11. Positioning the landing gear 12 laterally on the fuselage 11, allows for unimpeded air flow over the plurality of lift-generating rotors 3, the bi-wing structure. While the present invention is on the ground, the landing gear 12 suspends the fuselage 11 over the ground. The preferred embodiment of the landing gear 12 comprises tubular landing skids. The tubular landing skids may be significantly flexible in order to absorb the impact of hard landings.

Figure 5:
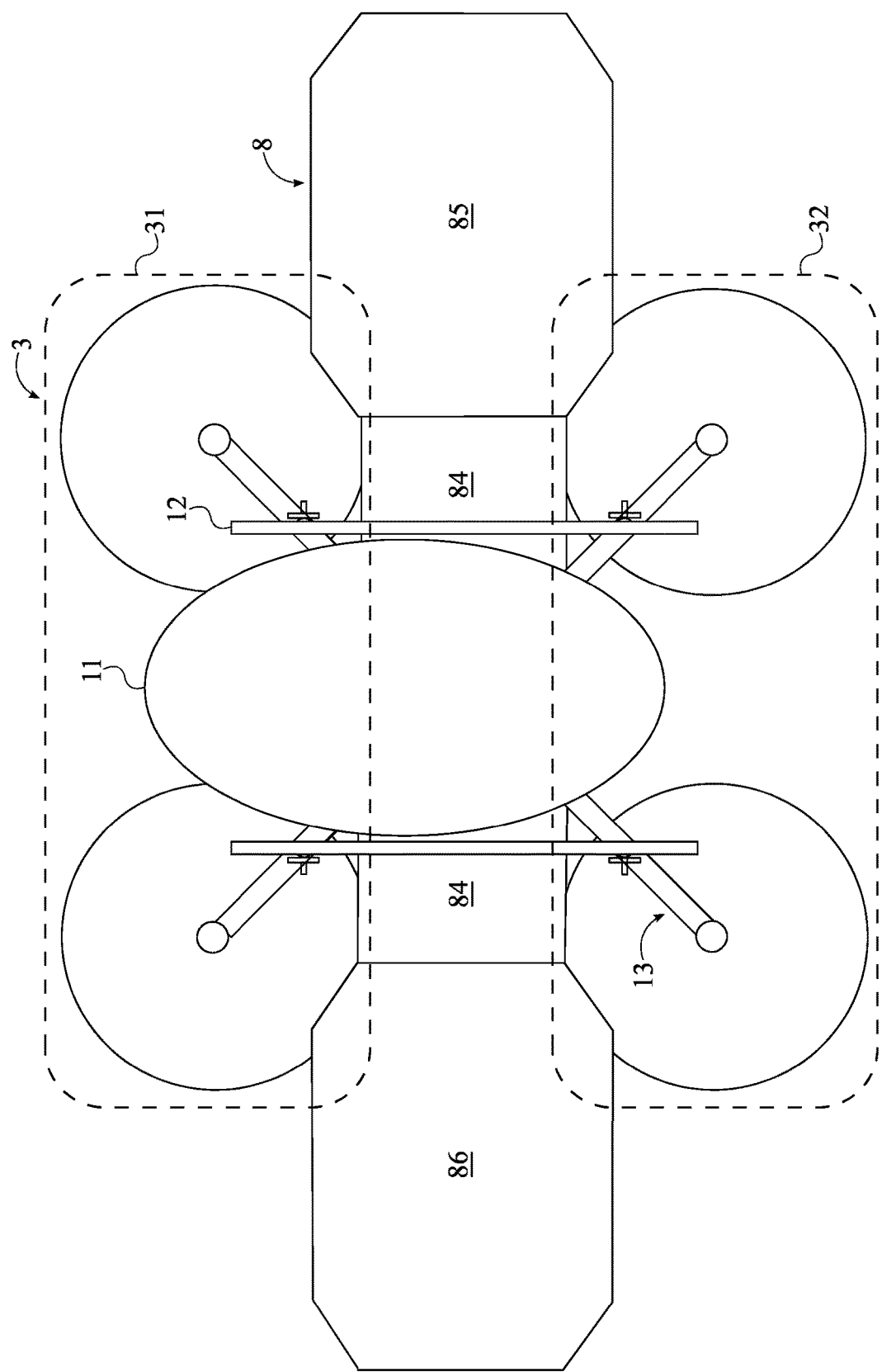
FIG. 5 is a bottom view of the present invention showing the landing gear in clear view.

As can be seen in FIG. 5, the plurality of lift-generating rotors 3 may be electrically powered rotors that generate vertical thrust which helps lift the present invention. The plurality of lift-generating rotors 3 comprises a set of front rotors 31 and a set of rear rotors 32. The front rotors are positioned in front of the fuselage 11, whereas the rear rotors are positioned in the rear of the fuselage 11. The plurality of pylons 13 is radially mounted around a yaw axis 10 of the fuselage 11. Accordingly, each of the plurality of lift-generating rotors 3 is operatively mounted to a corresponding pylon from the plurality of pylons 13, wherein the plurality of pylons 13 is used to lift the fuselage 11 with the plurality of lift-generating rotors 3. Separating the plurality of lift-generating rotors 3 into a set of front rotors 31 and a set of rear rotors 32 creates room to mount the bi-wing assembly onto the fuselage 11. Each pylon vertically and horizontally offsets a corresponding rotor from the plurality of lift-generating rotors 3. The bi-wing structure 5 is integrated perpendicularly to the fuselage 11. More specifically, the longitudinal axis of the bi-wing structure 5 is positioned perpendicular to the roll axis of the fuselage 11. The bi-wing structure 5 is positioned offset from the plurality of lift-generating rotors 3. This allows the bi-wing structure 5 to access clean upstream airflow, that is unimpeded by the set of front rotors 31. Additionally, the bi-wing structure 5 is positioned in between the set of front rotors 31 and the set of rear rotors 32. The air flow generated by the set of front rotors 31 combined with the upstream airflow created by the movement of the present invention increases the magnitude of the lift vector generated by the bi-wing structure 5.

Figure 3:
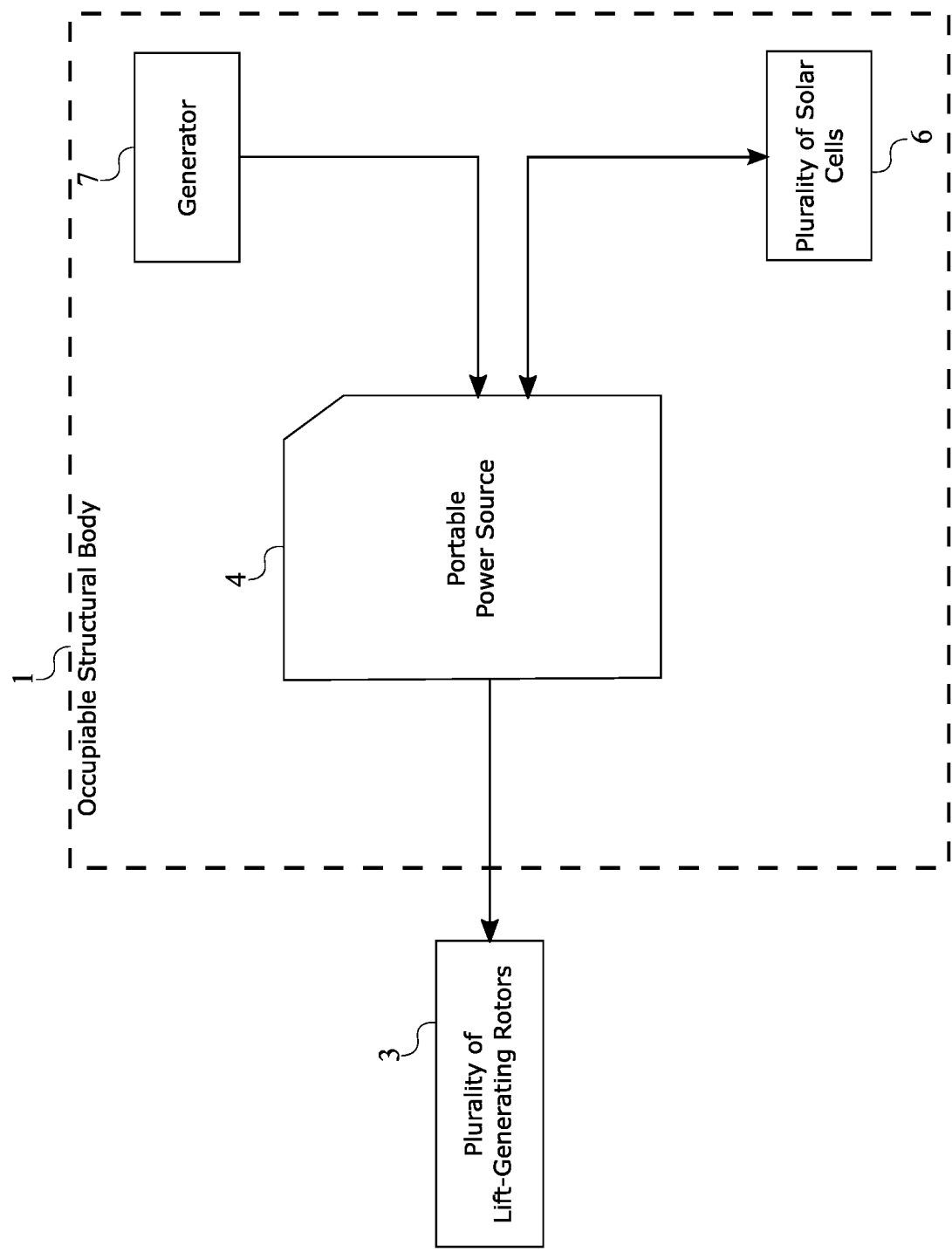
FIG. 3 is a schematic view of the electrical connections between electrically operated components.
Figure 4:
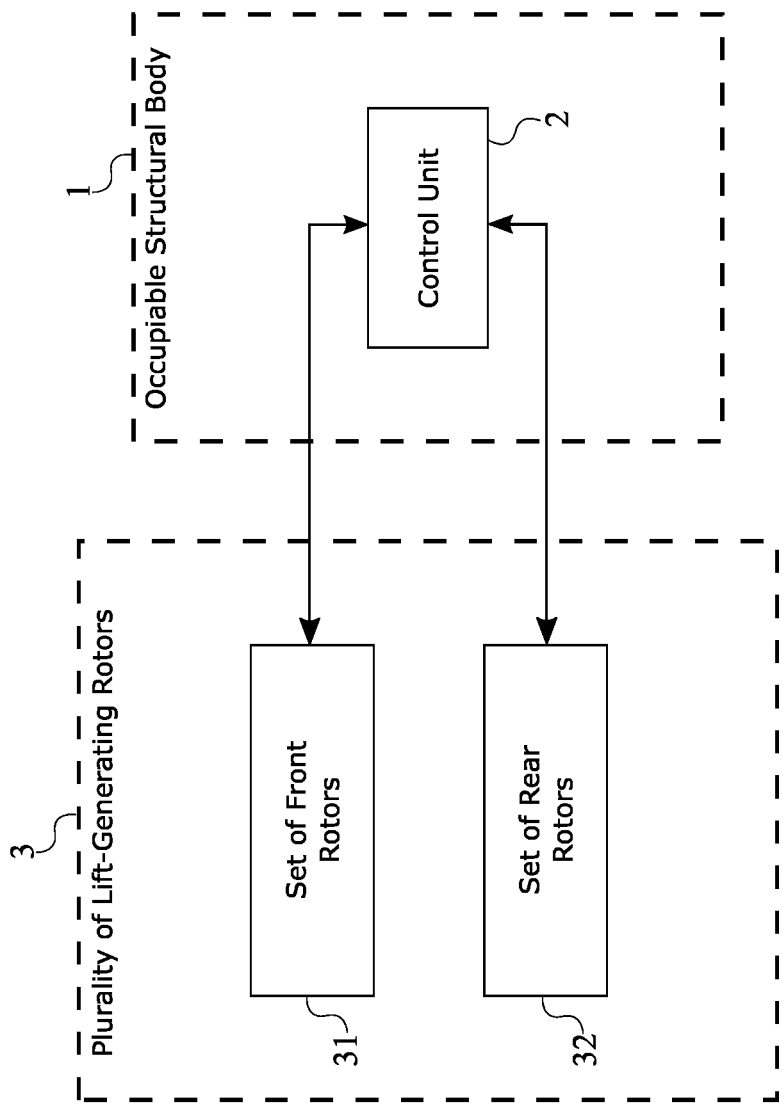
FIG. 4 is a schematic view of the electronic connections between electronically operation components.

Referring to FIG. 3 and FIG. 4, the portable power source 4 and the control unit 2 are mounted within the fuselage 11. In the preferred embodiment, the portable power source 4 is a rechargeable battery that provides electrical energy to the plurality of lift-generating rotors 3 and various other electrically operating components. As such, the portable power source 4 is electrically connected to the plurality of lift-generating rotors 3 as well as any electrically operated components. The control unit 2 controls the movement of the present invention. In particular, the control unit 2 controls the thrust generated by each of the plurality of lift-generating rotors 3 based on the inputs provided by the pilot. As such, the control unit 2 is electronically connected to the plurality of lift-generating rotors 3.

As can be seen in FIG. 3, the hybrid-power plant utilized in the present invention leverages a renewable power source as well as a non-renewable power source. Preferably, the renewable power source comprises a plurality of solar cells 6. The plurality of solar cells 6 harvests the solar energy and transforms it into electrical energy for the plurality of lift-generating rotors 3. As such, the plurality of solar cells 6 is distributed between and across the bi-wing structure 5. This positions the plurality of solar cells 6 in an area which receives high amounts of sunlight. This allows the present invention to harvest the maximum amount of solar energy. The plurality of solar cells 6 is also electrically connected to the portable power source 4. More specifically, the plurality of solar cells 6 may partially recharge the rechargeable battery. In addition, the non-renewable power source uses a generator 7 to generate electrical energy. The generator 7 is positioned within the fuselage 11. More specifically, the generator 7 may be positioned behind the seats and proximal to the center of gravity of the occupiable structural body 1. The generator 7 uses a non-renewable power source to generate electrical energy with which to recharge the rechargeable battery. Thus, the generator 7 is electrically connected to the portable power source 4. In the preferred embodiment, the generator 7 is a liquid hydrocarbon fueled turbine. The liquid hydrocarbon fuel such as kerosene or similar fuels are fed into a turbine connected to a generator 7. Thus, the turbine spins the generator 7 which in turn creates electricity.

Referring to FIG. 2 and FIG. 5, focusing now on the placement of the plurality of lift-generating rotors 3, in the preferred embodiment of the present invention, a rotation axis for each of the plurality of lift-generating rotors 3 is oriented parallel to the yaw axis 10 of the fuselage 11. As such, the thrust generated by the plurality of lift-generating rotors 3 always points directly below the fuselage 11, helping lift the fuselage 11. Additionally, this ensures that the reaction moment created by the plurality of lift-generating rotors 3 are always taken about the yaw axis 10.

In the preferred embodiment of the present invention, the plurality of pylons 13 are four pylons. Similarly, the plurality of lift-generating rotors 3 are four rotors each mounted to one of the pylons. The four-rotor design reduces mechanical complexity, thereby making the present invention highly reliable and highly maneuverable. The plurality of pylons 13 is radially positioned 90-degrees apart from each other. Thus, all four rotors are distributed evenly about the yaw-axis. Using the four rotors, the present invention can yaw, pitch, and roll, as well as translate in the vertical, horizontal, or any direction in between. In the preferred embodiment, at least two rotors may be rotating in the clock-wise direction and at least two rotors may be rotating in the counter-clockwise direction. More specifically, the two rotors positioned adjacent each other about the fuselage 11 rotate in opposite direction. Thus, the reaction moment caused by each of the rotors is canceled out. Reducing the rotation speed of any one of the four rotors, creates an imbalance which causes the present invention to spin about the yaw axis 10. In the preferred embodiment, the rotation speed of the rotors positioned opposite each other about the fuselage 11 is lowered in order to rotate the present invention about the yaw axis 10. This also prevents the generation of yaw or pitch moments. To translate the horizontal direction, the rotation speed of the rotor pointing towards the desired direction is lowered. This causes the present invention to tilt towards the direction of travel and translate in a horizontal path. Tilting towards a direction of travel is also analogous to rolling or pitching about an axis. Thus, changing the rotation speed on a rotor also allows the present invention to roll or pitch about an axis.

Figure 1:
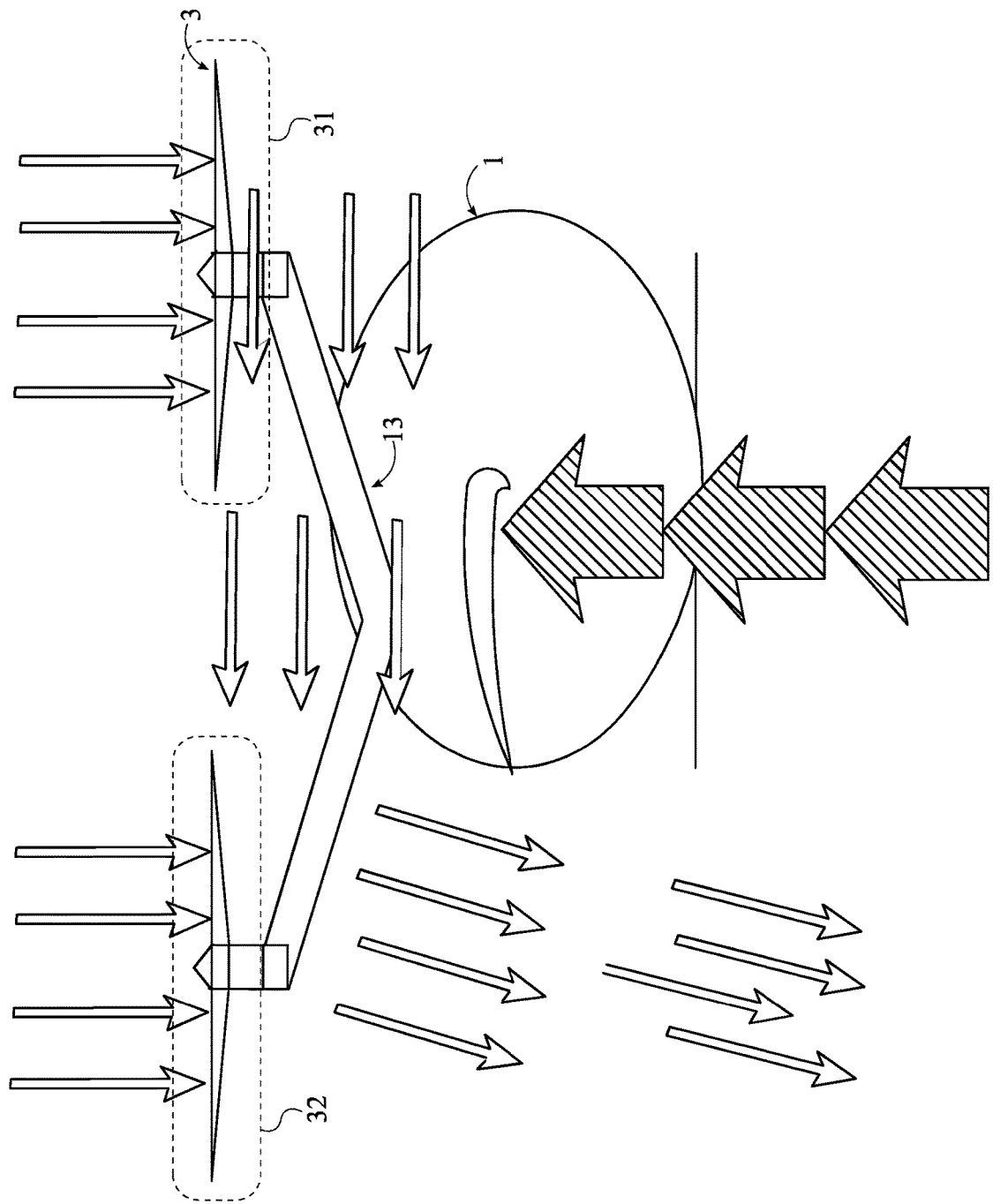
FIG. 1 is a simplified schematic view of the present invention showing the lift vector generated by the combined airflows of the plurality of lift-generating rotors and the wing structure.
Figure 7:
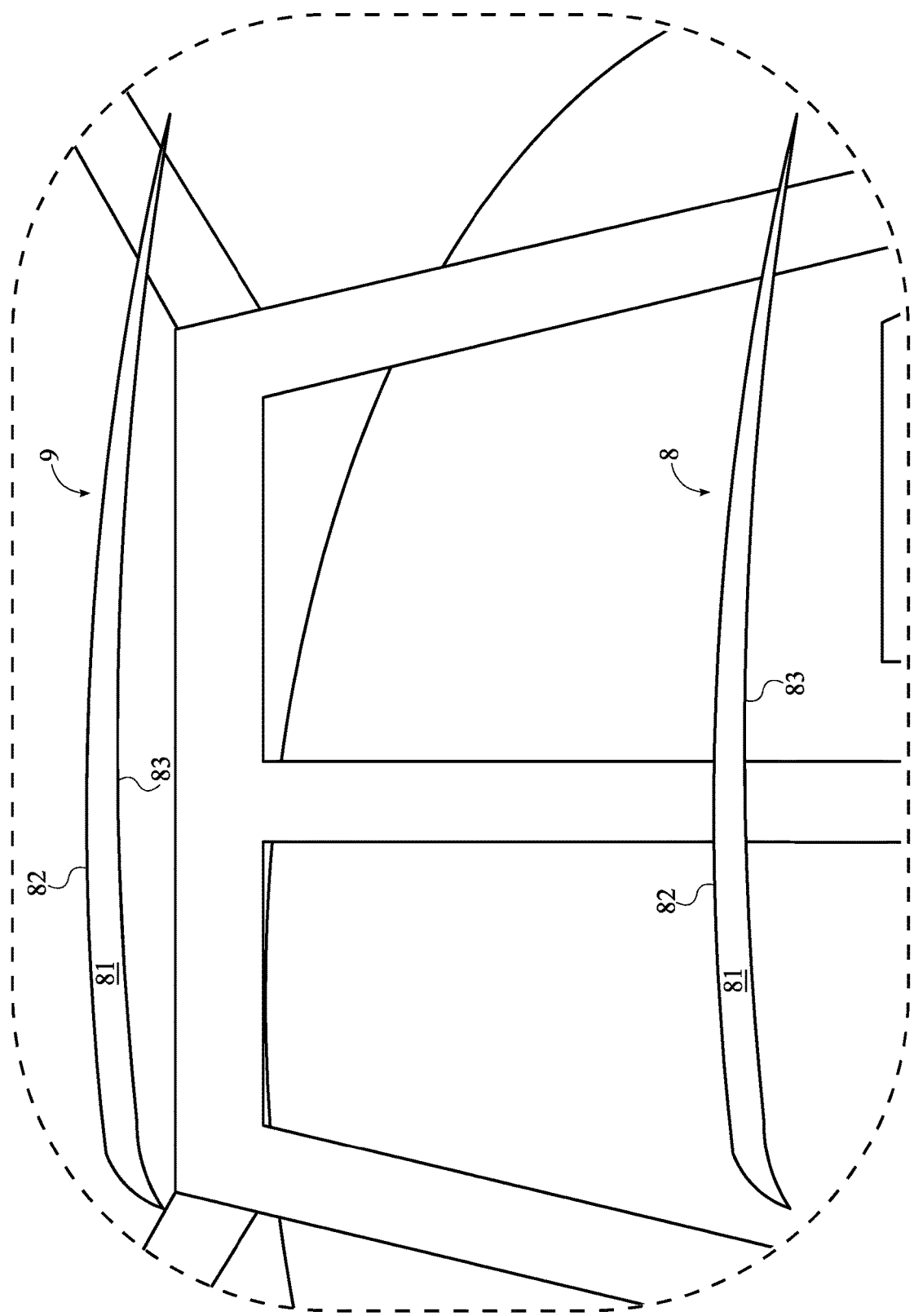
FIG. 7 is a detail view of the bi-wing assembly shown in FIG. 6.

In reference to FIG. 1, FIG. 6 and FIG. 7, focusing now on the positioning of the bi-wing structure 5, the preferred embodiment of the bi-wing structure 5 comprises a primary wing 8 and a secondary wing 9. In the preferred implementation, the primary wing 8 is substantially larger than the secondary wing 9. The fuselage 11 centrally traverses through the primary wing 8 and the secondary wing 9. This aligns the center of gravity of the present invention with the lift vector generated by the primary wing 8 and the secondary wing 9. Aligning the center of gravity and the lift vector eliminates pitch and roll moments which can destabilize the flight profile of the present invention. Additionally, the positioning of the primary wing 8 and the secondary wing 9 are also positioned to take advantage of the airflows generated by the plurality of lift-generating rotors 3. More specifically, the primary wing 8 is positioned adjacent to the plurality of lift-generating rotors 3. This allows the primary wing 8 to take advantage of the back-wash generated by the set of rear rotors 32. More particularly, the downwash delays the onset of vortices forming behind the trailing edge and thus increases the magnitude of the lift vector generated by the primary wing 8. The secondary wing 9 is positioned adjacent to the primary wing 8, opposite to the plurality of lift-generating rotors 3. Further, the primary wing 8 and the secondary wing 9 are positioned offset from each other along the yaw axis 10 of the fuselage 11. As such, this increases the effective wingspan of the bi-wing structure 5 while keeping the overall width of the present invention under reasonable means.

Referring specifically to FIG. 7, the primary wing 8 and the secondary wing 9 each comprise a wing body 81, a convex side 82, and a concave side 83. The convex side 82 and the concave side 83 is positioned opposite to each other about the wing body 81. When the present invention moves through the air, an area of low pressure forms over the convex side 82 of the wing body 81. Lift is generated by the resulting pressure difference between the convex side 82 and the concave side 83. Further, the convex side 82 is oriented towards the plurality of lift-generating rotors 3. Thus, the lift vector is positioned pointing upwards in relation to the wing and therefore the occupiable structural body 1. In contrast, the concave side 83 is oriented away from the plurality of lift-generating rotors 3. An area of low pressure forms at the front of the concave side 83. This also aids in generating lift over the present invention.

As can be seen in FIG. 2, the convex side 83 of the wing body 81 also provides a suitable area to place the plurality of solar cells 6. The convex side 83 provides a large planar area with a high surface area which receives a large amount of sunlight. Thus, the plurality of solar cells 6 is preferably integrated into the convex side 82 of the primary wing 8 and the secondary wing 9.

Figure 8:
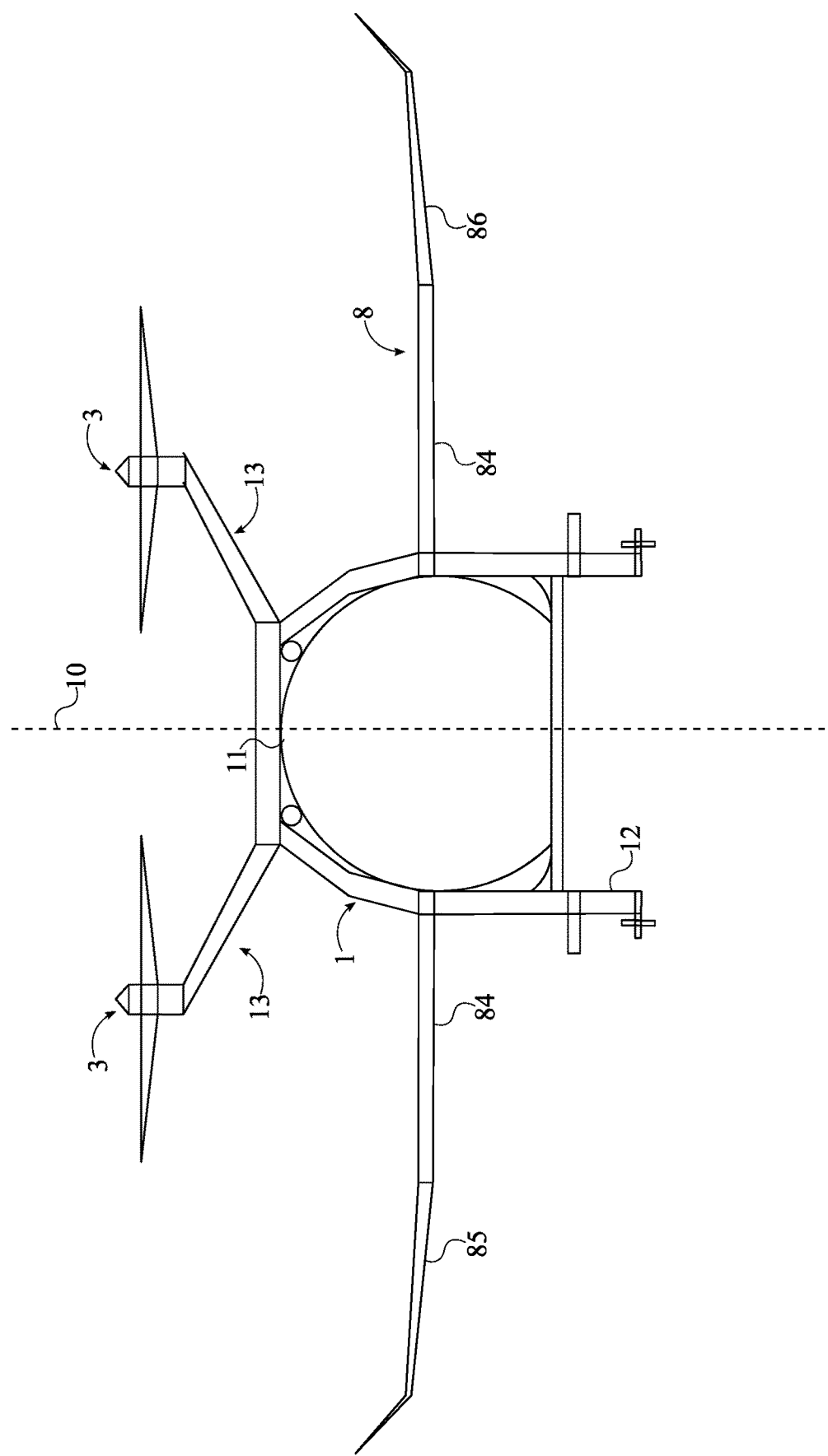
FIG. 8 is a front view of the present invention showing the bi-wing structure in the expanded position.
Figure 9:
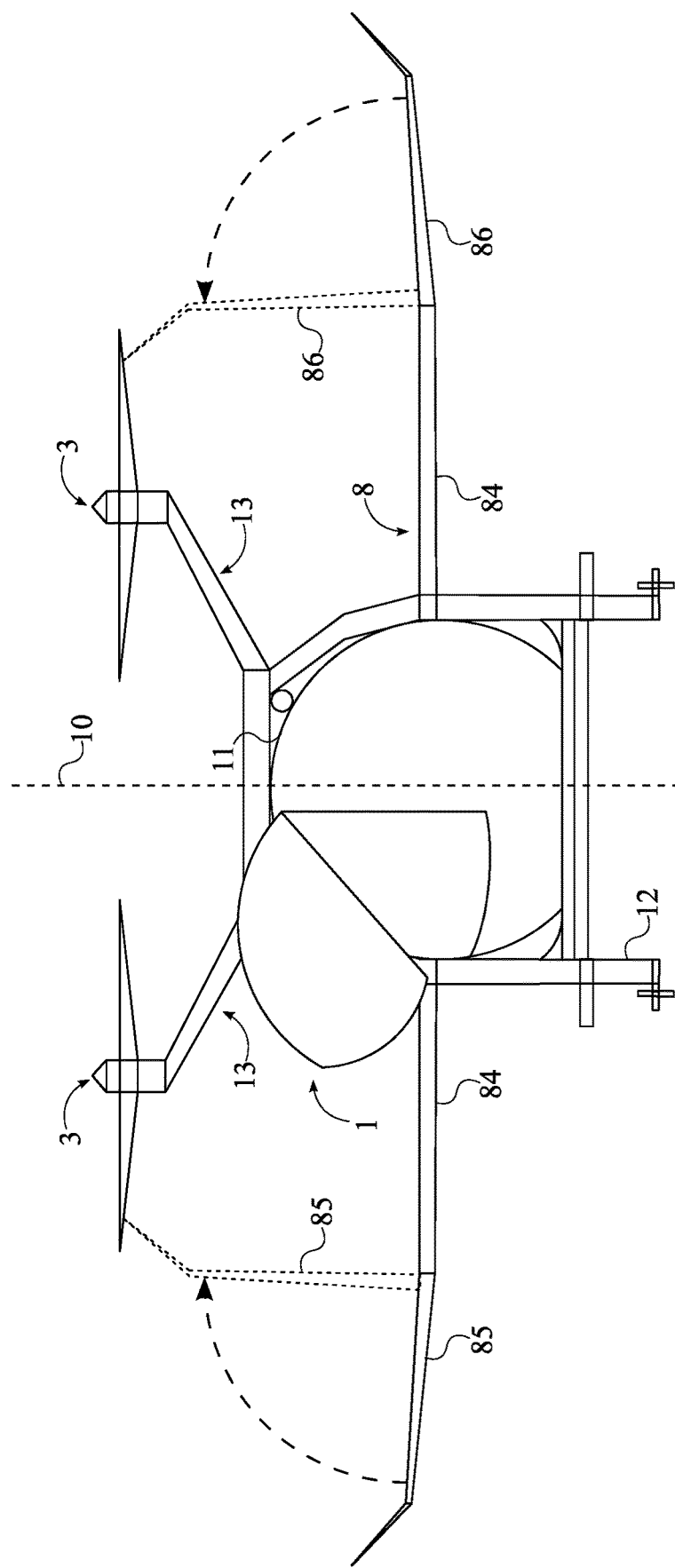
FIG. 9 is a front view of the present invention showing the first end portion and the second end portion in the folded position.

FIG. 8-9 show the present invention configured to be stored in a confined space. The primary wing 8 comprises a middle portion 84, a first end portion 85, and a second end portion 86. The fuselage 11 centrally traverses through the middle portion 84. More specifically, the middle portion 84 is immovably affixed to the fuselage 11. The middle portion 84 acts as a retaining point which allows the first end portion 85 and the second end portion 86 to movably attach thereon. As such, the first end portion 85 is terminally and hingedly connected to the middle portion 84. Similarly, the second end portion 86 is terminally and hingedly connect to the middle portion 84, opposite to the first end portion 85. Thus, the effective wingspan of the primary wing 8 can be adjusted by folding the first end portion 85 and the second end portion 86 about the middle portion 84. This allows the present invention to be stored in confined spaces.

Although the invention has been explained in relation to its preferred embodiment, it is to be understood that many other possible modifications and variations can be made without departing from the spirit and scope of the invention as hereinafter claimed.

What is claimed is:

1. A passenger-carrying rotorcraft with fixed-wings for generating lift comprising:
    an occupiable structural body;
    a control unit;
    a plurality of lift-generating rotors;
    a portable power source;
    a bi-wing structure;
    the occupiable structural body comprising a fuselage, a landing gear, and a plurality of pylons;
    the plurality of lift-generating rotors comprising a set of front rotors and a set of rear rotors;
    the landing gear being laterally mounted to the fuselage;
    the plurality of pylons being radially mounted around a yaw axis of the fuselage;
    each of the plurality of lift-generating rotors being operatively mounted to a corresponding pylon from the plurality of pylons, wherein the plurality of pylons is used to lift the fuselage with the plurality of lift-generating rotors;
    the bi-wing structure being integrated perpendicular to the fuselage;
    the bi-wing structure being positioned offset from the plurality of lift-generating rotors;
    the bi-wing structure being positioned in between the set of front rotors and set of rear rotors;
    the portable power source and the control unit being mounted within the fuselage;
    the portable power source being electrically connected to the plurality of lift-generating rotors; and the control unit being electronically connected to the plurality of lift-generating rotors;
    the bi-wing structure comprising a primary wing and a secondary wing;
    the fuselage centrally traversing through the primary wing and the secondary wing;
    the primary wing being positioned adjacent to the plurality of lift-generating rotors;
    the secondary wing being positioned adjacent to the primary wing, opposite to the plurality of lift-generating rotors; and
    the primary wing and the secondary wing being positioned offset from each other along the yaw axis of the fuselage.

2. The passenger-carrying rotorcraft with fixed-wings for generating lift as claimed in claim 1 comprising:
    a plurality of solar cells;
    the plurality of solar cells being distributed across the bi-wing structure; and
    the plurality of solar cells being electrically connected to the portable power source.

3. The passenger-carrying rotorcraft with fixed-wings for generating lift as claimed in claim 1 comprising:
    a generator;
    the generator being positioned within the fuselage; and
    the generator being electrically connected to the portable power source.

4. The passenger-carrying rotorcraft with fixed-wings for generating lift as claimed in claim 3, wherein the generator is a liquid hydrocarbon fueled turbine.

5. The passenger-carrying rotorcraft with fixed-wings for generating lift as claimed in claim 1 comprising:
    the plurality of pylons being four pylons;
    the plurality of lift-generating rotors being four rotors; and
    the plurality of pylons being radially positioned 90-degrees apart from each other.

6. The passenger-carrying rotorcraft with fixed-wings for generating lift as claimed in claim 5 comprising:
    the primary wing and the secondary wing each comprise a wing body, a convex side, and a concave side;
    the convex side and the concave side being positioned opposite to each other about the wing body;
    the convex side being oriented towards the plurality of lift-generating rotors; and
    the concave side being oriented away from the plurality of lift-generating rotors.

7. The passenger-carrying rotorcraft with fixed-wings for generating lift as claimed in claim 5 comprising:
    the primary wing comprising a middle portion, a first end portion, and a second end portion;

the fuselage centrally traversing through the middle portion;

the first end portion being terminally and hingedly connected to the middle portion; and the second end portion being terminally and hingedly connected to the middle portion, opposite to the first end portion.

8. The passenger-carrying rotorcraft with fixed-wings for generating lift as claimed in claim 1, wherein the portable power source is a rechargeable battery.

9. The passenger-carrying rotorcraft with fixed-wings for generating lift as claimed in claim 1, wherein a rotation axis for each of the plurality of lift-generating rotors is oriented parallel to the yaw axis of the fuselage.

10. A passenger-carrying rotorcraft with fixed-wings for generating lift comprising:
an occupiable structural body;
a control unit;
a plurality of lift-generating rotors;
a portable power source;
a bi-wing structure;
the occupiable structural body comprising a fuselage, a landing gear, and a plurality of pylons;
the plurality of lift-generating rotors comprising a set of front rotors and a set of rear rotors;
the bi-wing structure comprising a primary wing and a secondary wing;
the landing gear being laterally mounted to the fuselage;
the plurality of pylons being radially mounted around a yaw axis of the fuselage;
each of the plurality of lift-generating rotors being operatively mounted to a corresponding pylon from the plurality of pylons, wherein the plurality of pylons is used to lift the fuselage with the plurality of lift-generating rotors;
the bi-wing structure being integrated perpendicular to the fuselage;
the bi-wing structure being positioned offset from the plurality of lift-generating rotors;
the bi-wing structure being positioned in between the set of front rotors and set of rear rotors;
the portable power source and the control unit being mounted within the fuselage;
the portable power source being electrically connected to the plurality of lift-generating rotors; and the control unit being electronically connected to the plurality of lift-generating rotors;
the fuselage centrally traversing through the primary wing and the secondary wing;
the primary wing being positioned adjacent to the plurality of lift-generating rotors; and
the secondary wing being positioned adjacent to the primary wing, opposite to the plurality of lift-generating rotors; and the primary wing and the secondary wing being positioned offset from each other along the yaw axis of the fuselage.

11. The passenger-carrying rotorcraft with fixed-wings for generating lift as claimed in claim 10 comprising:
a plurality of solar cells;
a generator;
the plurality of solar cells being distributed across the bi-wing structure;
the plurality of solar cells being electrically connected to the portable power source;
the generator being positioned within the fuselage; and
the generator being electrically connected to the portable power source.

12. The passenger-carrying rotorcraft with fixed-wings for generating lift as claimed in claim 11, wherein the generator is a liquid hydrocarbon fueled turbine.

13. The passenger-carrying rotorcraft with fixed-wings for generating lift as claimed in claim 10 comprising:
the plurality of pylons being four pylons;
the plurality of lift-generating rotors being four rotors; and
the plurality of pylons being radially positioned 90-degrees apart from each other;
the bi-wing structure comprising a primary wing and a secondary wing;
the fuselage centrally traversing through the primary wing and the secondary wing;
the primary wing being positioned adjacent to the plurality of lift-generating rotors;
the secondary wing being positioned adjacent to the primary wing, opposite to the plurality of lift-generating rotors; and
the primary wing and the secondary wing being positioned offset from each other along the yaw axis of the fuselage.

14. The passenger-carrying rotorcraft with fixed-wings for generating lift as claimed in claim 10 comprising:
the primary wing and the secondary wing each comprise a wing body, a convex side, and a concave side;
the convex side and the concave side being positioned opposite to each other about the wing body;
the convex side being oriented towards the plurality of lift-generating rotors; and
the concave side being oriented away from the plurality of lift-generating rotors.

15. The passenger-carrying rotorcraft with fixed-wings for generating lift as claimed in claim 10 comprising:
the primary wing comprising a middle portion, a first end portion, and a second end portion;
the fuselage centrally traversing through the middle portion;
the first end portion being terminally and hingedly connected to the middle portion; and
the second end portion being terminally and hingedly connect to the middle portion, opposite to the first end portion.

16. The passenger-carrying rotorcraft with fixed-wings for generating lift as claimed in claim 10, wherein the portable power source is a rechargeable battery.

17. The passenger-carrying rotorcraft with fixed-wings for generating lift as claimed in claim 10, wherein a rotation axis for each of the plurality of lift-generating rotors is oriented parallel to the yaw axis of the fuselage.

* * * * *